United States Patent [19]
Bartlett, Jr.

[11] Patent Number: 5,958,991
[45] Date of Patent: *Sep. 28, 1999

[54] OPEN-LOOP METHOD FOR PRODUCING A CONTROLLED BLEND OF POLYOL AND BLOWING AGENT FOR USE IN THE MANUFACTURE OF POLYURETHANE FOAM

[76] Inventor: Henry Walker Bartlett, Jr., P.O. Box 361, Decatur, Ala. 35602

[ * ] Notice: This patent issued on a continued prosecution application filed under 37 CFR 1.53(d), and is subject to the twenty year patent term provisions of 35 U.S.C. 154(a)(2).

[21] Appl. No.: 08/691,510

[22] Filed: Aug. 2, 1996

[51] Int. Cl.$^6$ ........................................................ C08J 9/04
[52] U.S. Cl. ........................ 521/131; 521/159; 264/45.1; 252/182.24
[58] Field of Search ..................................... 521/159, 131; 264/45.1; 252/182.24

[56] References Cited

U.S. PATENT DOCUMENTS 5,444,100  8/1995  Takezawa et al. ...................... 521/131

*Primary Examiner*—John M. Cooney, Jr.
*Attorney, Agent, or Firm*—Bradley Arant Rose & White LLP; J. David Pugh; Nathan W. Johnson

[57] ABSTRACT

A novel methodology and apparatus have been discovered which is of value in the production of polyurethane foam. This invention relates to a one-pass, on-demand process and apparatus for producing a controlled, homogeneous blend of the polyol-blowing agent mixture used in the manufacture of polyurethane foam using either a low-boiling point or high-boiling point blowing agent. A method is provided to control the amount of each material in the mixture, ensure homogeneous blending of the two materials after mixing, a pressure control means to maintain blowing agents in their liquid state (where necessary), and a monitoring means which allows rapid verification of the operating status of the entire system. The process is comprised of:

(a) using variable flow rate displacement pumps for both materials;

(b) using mass flow meters to determine the mass flow rates of both materials;

(c) using electronic controllers to control the output of the pumps based on preselected input values, and thereby controlling the ratio of the mixture formed by the combination of the two materials;

(d) feeding the mixture of materials into a blending zone;

(e) application of kinetic blending energy to produce a homogeneous mixture;

(f) the use of a back pressure control device to ensure that the processing of the materials is carried out at a pressure above the vapor pressure of the blowing agent; and (g) passing the blended material through a mass flow meter to ensure the accuracy of the mixture, that is, the sum of mass flow rates of the ingredient materials should equal the total mass flow rate of the blended materials.

37 Claims, 1 Drawing Sheet

OPEN-LOOP METHOD FOR PRODUCING A CONTROLLED BLEND OF POLYOL AND BLOWING AGENT FOR USE IN THE MANUFACTURE OF POLYURETHANE FOAM

FIELD OF THE INVENTION

This invention relates to the production of polyurethane foams, and more particularly, to a method and apparatus for mixing certain polyurethane precursor materials in an open-loop, single pass, processing system.

BACKGROUND OF THE INVENTION

Historically, the manufacture of rigid foamed polyurethanes has typically included the use of various combinations of a polyol, isocyanate, water, and trichlorofluoromethane (CFC-11) as a foaming or blowing agent. Traditionally, the materials were mixed together in a step-wise process. The polyol provided the polymer component which, when reacted with isocyanate, would polymerize and harden. Both polyol and isocyanate are liquid materials. The blowing agents traditionally used, such as CFC-11, are also liquid at room temperature but upon heating or undergoing rapid pressure reduction will volatilize. The addition of a blowing agent during the mixture process will create gaseous expansion upon either temperature elevation or pressure reduction within the polymerizing polyol matrix thereby causing the polyol to foam. Foamed polyurethanes have good mechanical and thermal insulating properties and show excellent dimensional stability, and chemical resistance. The foaming process allows the polyurethane to expand to fill a void defined by a formed structure such as a refrigerator door or body panel. Polyurethane foams are widely used as thermal insulating materials for home appliances, truck trailers and railroad cars, insulated storage vessels, building materials, and certain parts for automobiles.

It is well known in the art of foam production that use of liquid blowing agents is highly desirable. The reason is that foaming of the polyol is desired to occur as a final step in the process as the reactants are added to their mold. Generally, the blowing agent is added to polyol and mixed, then the blended mixture is subsequently added to isocyanate just prior to injection into a mold. Concerning the mixture of polyol to blowing agent, it has been common practice in those industries making polyurethane foams to use batch mixing process techniques to mix large volumes because of the relative insolubility of some common blowing agents with polyol. In batch mixing, the blowing agent is added to the foam polymer (preferably polyol) and continuously mixed by recirculating the mixture through a mixing reservoir over a lengthy period of time resulting, eventually, in a batch of mixed or, "blended," polyol and blowing agent. The time of mixing is directly related to the volume being mixed and the degree of difficulty of solubilizing the blowing agent into the polyol. Once the desired ratio of blowing agent and polyol was obtained and the materials thoroughly mixed, the process could be allowed to proceed to the polymerization and foaming steps by the addition of isocyanate and reduction of pressure or elevation of temperature. One aspect of realizing the solubility of some blowing agents with polyol was the necessity of keeping the blowing agent/polyol mix under constant high partial pressure of either an inert gas, such as nitrogen, or causing supersaturated conditions by pumping excess blowing agent into the mixing tank, the tank being kept in a closed loop isolated from and elevated relative to atmospheric pressure. For economic reasons, practitioners typically desired to make large quantity batches mixed well in advance of their needed use. The advance mixing and subsequent storage over a relatively long period of time allowed the use of common quality control techniques, such as sampling and weighing, to test the blended material and ensure compliance with specifications. Much of the mixing techniques were carried out on a trial and error basis. One significant problem of such mixing processes has been the retention of some blowing agents dispersed in the polyol. If, prior to use, the batches were found to be out of specification, the mixtures were reprocessed by adding the amounts of the various components to bring the blend within desired specifications. This process required remixing of the reagents with materials being routed back to mixing chambers. Such processes are inefficient, cumbersome and require additional and expensive equipment.

The prior art offers numerous examples of attempts at advancing the art of making polyurethane foam. Critical to the formation of foam is the amount and homogeneity of dissolved blowing agent. Properties of the quality of the foam will vary greatly depending on the amount, dispersion, and type of the blowing agent used. The present invention provides for a means by which polyol and blowing agent may be mixed under highly controlled pressure levels and flow rates. A significant advantage of the present invention over prior art is the elimination of a need for batch mixing and the ability to monitor and control precisely both the amounts of reagents added together and the mixing thereof. The present invention allows for predetermination of all essential parameters of the materials used in the process of creating blended polyol giving reproducability, predictability, and consistency in the foam formed from the blended polyol prepared by the present invention.

The present invention is patentably distinguishable from previous improvements in numerous respects. For example, U.S. Pat. No. 4,132,838 entitled, PROCESS AND APPARATUS FOR THE PREPARATION OF A REACTION MIXTURE FOR THE PRODUCTION OF PLASTIC FOAMS, by K. D. Kreuer et al., discloses an apparatus designed to obtain better control of mixing blowing gases with one of the reagents in order to achieve predictable homogeneity in the polyol/gas mixture. Kreuer's apparatus essentially controlled the velocity of flow rates of one of the reaction reagents into which a gas blowing agent was aspirated. Unlike the present invention which maintains the blowing agent in the liquid phase, Kreuer's device contemplated use of a vapor phase blowing agent, the addition of which to polyol was not under strict user control. Moreover, one embodiment of the Kreur system required return flow to a batch mixing chamber. Likewise, U.S. Pat. No. 4,157,427 entitled, METHOD FOR ENTRAINING GAS IN A LIQUID CHEMICAL PRECURSOR FOR REACTION INJECTION MOLDING, by G. Ferber, disclosed an improvement in sampling the amount of vapor phase blowing agent infused into one of the reaction components. However, like other examples of the prior art, the apparatus contemplated recirculation of the reactant/gas mixture to a batch mixing chamber.

Various other improvements are found in the prior art which concern the mixing of a gas blowing agent. U.S. Pat. No. 4,288,230 entitled METHOD AND A DEVICE FOR THE PRODUCTION OF A SOLID-FORMING OR FOAM-FORMING FLOWABLE REACTION MIXTURE, by W. Ebeling and V. Tennemann disclosed determining gas infusion by measuring quantitative flow rates of gas by taking density readings against volumetric flow. This device merely added gas and recirculated the gas/polyol mixture until the desired mix was obtained as determined by taking density and volumetric flow readings. In U.S. Pat. No. 4,376,172 entitled CLOSED LOOP CONTROL OF COMPRESSIBLE FLUID ADDITION TO A MIXTURE OF SUCH FLUID AND A LIQUID, by G. Belangee et al., a recirculation type system is disclosed that uses a plunger to measure the amount of gas blowing agent to be infused.

In U.S. Pat. No. 4,526,907 entitled PROCESS AND DEVICE FOR THE PREPARATION OF A REACTION MIXTURE OF AT LEAST TWO COMPONENTS FOR THE PRODUCTION OF FOAMS, by H. Thiele et al., another method of infusing gas blowing agent is disclosed for use in a closed loop system. Other patents such as, U.S. Pat. No. 4,933,115 entitled PROCESS FOR THE PRODUCTION OF A FLOWABLE MIXTURE WHICH REACTS TO FORM FOAM FROM FLOWABLE COMPONENTS STORED IN STORAGE CONTAINERS, by K. Krippl, and U.S. Pat. No. 5,000,882 entitled APPARATUS FOR THE PREPARATION OF A FREE-FLOWING MIXTURE OF FREE-FLOWING COMPONENTS WHICH REACTS TO FORM FOAM, by F. Proksa, et al., disclose variations on the methodology of either addition of the blowing agent or the measurement thereof.

In addition to advances made in the art of infusing blowing agents, the art of foam production has had to make adjustments in the use of chemicals and gases for environmental and safety reasons. Based on theories that CFC compounds, particularly Freon, contribute to destruction of the protective ozone layer in the atmosphere, legislation has been passed in many countries regulating and/or prohibiting the manufacture or use of the traditional materials used as polyurethane blowing agents. The Clean Air Act of 1990 placed deadlines and restrictions on the use and manufacture of all CFC compounds. Compliance with legal restrictions requires the use of new methods and materials in the production of polyurethane foams, particularly regarding new blowing agents. Consequently a compelling need has arisen for new processes which will allow flexibility in selection of the blowing agent for the manufacture of polyurethane foams.

The polyurethane foam industry is in a state of transition. Traditional blowing agents have typically had relatively high boiling points with easily manipulated volatility making them relatively easy to use, mix, and store in the polyurethane production process. For example, CFC-11 or Freon, has a boiling point of approximately 75 degrees F. at atmospheric pressure. The environmentally friendly blowing agents coming into use because of the recent legislation have not been so easy to use because of low boiling points and high volatility. For example, 1,1,1,2 tetrafluoroethane (HFC-134a) has a boiling point of approximately minus 15 degrees F. Moreover, some high boiling agents have exhibited low volatility requiring input of heat energy into the reaction process. Other blowing agents with very low boiling points have often exhibited properties which made their use problematic. For instance, hydrochloroflurocarbons have been shown generally to exhibit rapid vaporization giving rise to difficulty in keeping the material in solution during batch mixing as well as causing cooling of the reactant mixture with subsequent loss of expansion capacity during foam formation. Production equipment able to accommodate such new materials will require the ability to use blowing agents that have either a low or high boiling point. For example, Allied Signal manufactures more than 15 compounds, classified as refrigerants, with boiling points ranging from minus 126 to 117 degrees F., several of which have potential use as blowing agents. Moreover, the new processes will require equipment able to mix and blend components more quickly and more accurately than the batch mixing processes of the prior art. Where the process is to be adapted to existing polyurethane production systems, the new processes should be able to operate effectively with minimum redesign to existing systems.

Advancements in the art have begun to address these environmentally related problems. U.S. Pat. No. 5,055,272 entitled, METHOD FOR PRODUCING POLYURETHANE FOAM AND APPARATUS THEREFOR, by R. Wheeler et al., discloses an apparatus which is designed to use non-fluorocarbon gases and is also a single flow through system. However, unlike the present invention, Wheeler's device uses an expandable bladder that is pressurized by vapor phase gas and acts to maintain pressure for the gas as it is pumped into the liquid polyol. This type of device differs markedly from the present invention not only because of its use of vapor phase blowing agent, but also for the fact that the pressure within the system cannot be accurately maintained due to the constant motion of contraction and expansion of the pump bladder. Thus, pressures in the system are continuously in flux rather than able to be maintained at a constant value. In U.S. Pat. No. 5,472,990 entitled METHOD AND APPARATUS FOR NUCLEATION OF POLYURETHANE FOAM WHICH RESULTS IN SELF-ADHERING MICROCELLULAR FOAM, by T. Craig et al., a single pass system is presented which is designed for using air as the blowing agent which is pumped into the polyol to create bubbles like the aforementioned art. The design of this system also relies on only one metering pump to pass the liquid reactants through the apparatus. Such a system makes accurate control of the quantities of each reactant difficult. In another example, U.S. Pat. No. 5,252,625 entitled METHOD FOR PRODUCING RIGID FOAMS AND PRODUCTS PRODUCED THEREFROM, by A. McLaughlin, a device is disclosed which is able to utilize various blowing compounds but it incorporates a preblend mixing tank which also only uses a static mixer to infuse the gas with liquid component. Like the earlier batch mix apparatuses, there is little accuracy or control over the retention of blowing agent in the liquid phase or the measurement thereof. Finally, U.S. Pat. No. 5,444,100 entitled METHOD FOR THE MIXING OF LOW-BOILING FOAMING AGENT, by M. Takezawa, discloses an apparatus designed to use environmentally safe blowing agents but the machine is specifically designed only to handle low-boiling point blowing agents. Moreover, just like the earlier prior art processes, this apparatus requires a recirculation gas/polyol mix tank.

The present invention addresses the drawbacks of previous advancements in the art by eliminating the need for recirculation batch mixing by providing an open-loop, single pass, "on demand" system, that is, a process system that can accurately mix and blend specified amounts of liquid reagents (polyol and liquified blowing agent), monitor the amounts of each reactant before and after blending, and present the blended mixture with known composition directly to a foaming extrusion head or to a day use tank storage under conditions which will allow maintenance of known reactant ratios. Because of the high degree of versatility in the manner in which reaction components may be added and monitored, the present invention also addresses the difficulties associated with legislative requirements by allowing various types of environmentally-friendly chemical blowing agents to be employed. Moreover, the versatility allows the device the capacity for accommodating both high and low-boiling point blowing agents. Concerning low boiling point blowing agents, a preferred embodiment of the present invention is use of 1,1,1,2 tetrafluoroethane (HFC-134a). This compound is known to be highly insoluble in polyol and has been used by others wherein a solubilizing agent, such as dimethyl ether (DME) was necessary (U.S. Pat. No. 5,409,962 entitled SUBSTANTIALLY CONSTANT BOILING BLOWING AGENT COMPOSITIONS OF 1,1,1,2 TETRAFLUOROETHANE AND DIMETHYL ETHER by P. L. Bartlett and J. A. Creazzo) to cause acceptable solubilization of the HFC-134a in the polyol. It is known that very small amounts of some solubilizing agents, such as DME, can have dramatic effects on enhancing the solubility of such compounds as HFC-134a in polyol. However, use of such solubilizing agents may cause problems with the polymerization process and the use of such agents therefore should be avoided where possible. A major advantage and a preferred embodiment of the current invention is the ability of solubilizing HFC-134a into polyol in a pure form without the need for any solubilizing substance.

SUMMARY OF THE INVENTION

A novel methodology and apparatus have been discovered which is of value in the production of polyurethane foam. Specifically, the present invention is directed to a method and apparatus by which the polyol and blowing agent components of polyurethane are continuously and accurately mixed and blended without the necessity of recirculating the blend through a closed-loop, batch tank process. One object of the present invention is the ability of the apparatus and process to use a variety of known blowing agents. Other objects of the invention are the ability to control the amount of each material in the blended polyol mixture, to ensure homogeneous blending of materials after mixing, to maintain control of pressure of the blowing agents to assure that they remain in their liquid state (where necessary) prior to foaming, and to provide monitoring means allowing rapid verification of the operating status of the entire system.

A primary object of the current invention is to provide a single pass, "on demand" apparatus and method which is able to maintain the blowing agent in a liquid state with tight control over pressures, flow rates, and/or temperatures at which blending and mixing takes place, and in which accurate control of blowing agent to polyol reactant ratios are maintained. Another object of the current invention is to provide an effective means of mixing and blending two or more liquid materials, one of which is the blowing agent and the other of which is the polyol, to produce the blended polyol used in the manufacture of polyurethane foam.

Another object of the invention is to provide control of the ratio of blowing agent to polyol by using mass flow rate measurement and electronic control techniques. Mass flow measurement is superior to volumetric flow measurement for the reason that due to the expansion capacity of typical blowing agents, especially where there is not strict control of pressures on the reactants throughout the system, the materials in the system can experience substantial changes in volume. Therefore, by determining mixture component ratios based solely on volume of flow, substantial errors in calculating the actual amount of blowing agent will occur. Because the ratio of polyol to blowing agent is critical to the quality of foam produced, a greater degree of precision than that offered by prior art devices using volumetric measurement means is desired. The present invention provides the greater precision required by using mass flow measurement which avoids the possibility of errors due to volume variations caused by changing system dynamics (e.g. pressure or temperature).

A further object of the invention is to maintain a liquid state of whatever blowing agent is selected for use, and provide instantaneous blending of the ingredients in the mixture, the mixing and blending to be accomplished on-demand requiring only one pass of the materials through the system without the necessity for recirculation to a batch tank.

Another embodiment of the invention provides a method and apparatus suitable for processing a wide variety of blended polyol materials. For instance, the current invention will allow selective operating pressures necessary to satisfy the requirements of a wide variety of blowing agent and polyol combinations. In addition, a further object of the invention is the ability to control the ratio of polyol to blowing agent for the purpose of creating mixtures of reagents yielding products with variable properties.

While not necessary to the practice of the invention, it is recognized that control of the temperature and pressure both immediately prior to entering the method and apparatus and/or immediately after exiting the method and apparatus of the present invention, may be desired to achieve satisfactory results in certain specific situations. Therefore, one embodiment of the present invention includes a temperature control means on the blowing agent conduit at a point just prior to the pump used to transport these agents into the system of this invention. The invention may also include the use of other monitoring equipment such as temperature controllers and sight glass windows at various locations along the pathway of the system which can be electronically linked to an electronic process controller.

BRIEF DESCRIPTION OF THE DRAWINGS

The foregoing and other objects, features and advantages of the present invention will be made apparent from the following detailed description of the preferred embodiment of the invention, and from the drawings, in which.

DETAILED DESCRIPTION OF THE INVENTION

Figure 1:
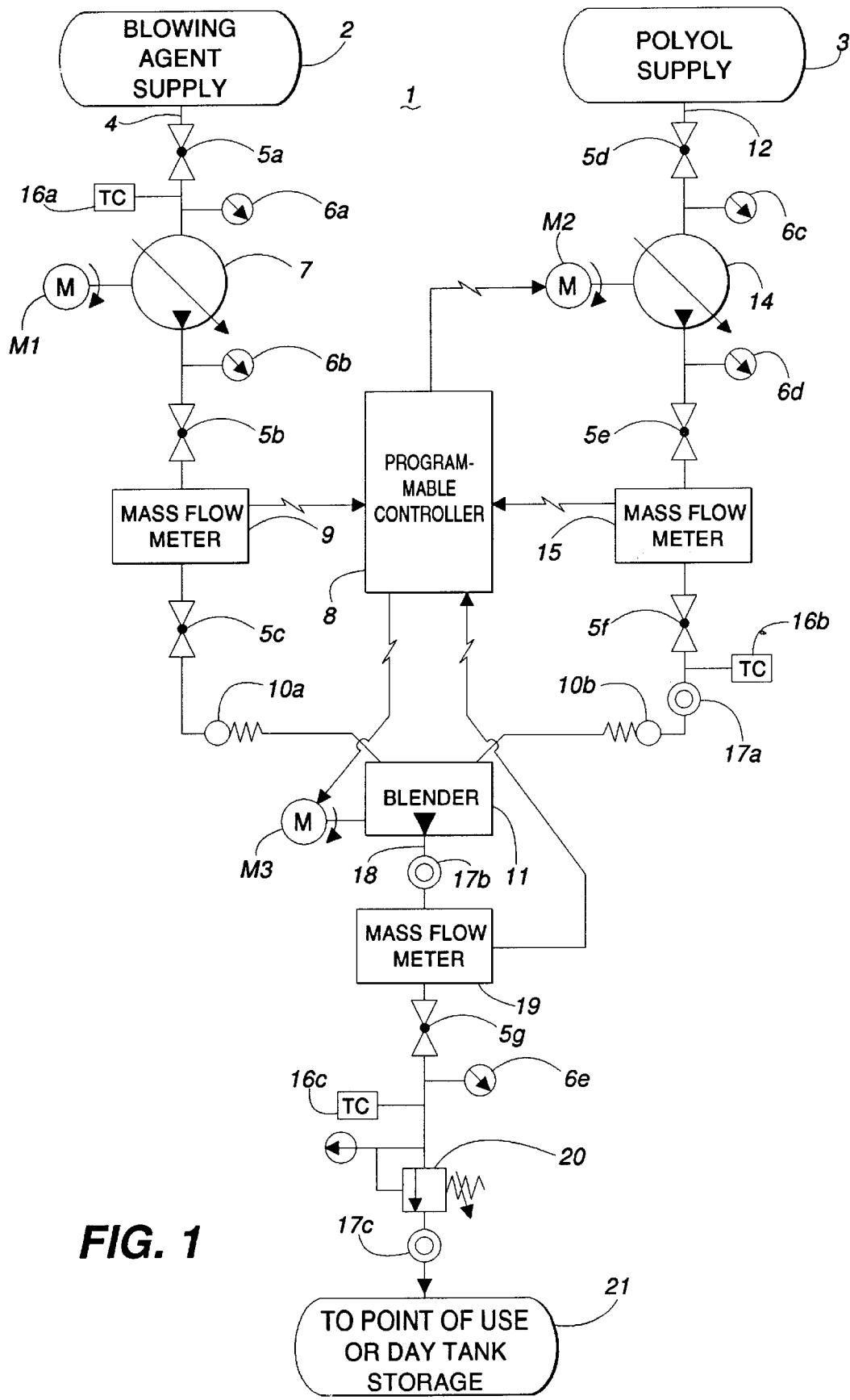
FIG. 1 is a schematic drawing depicting a flow chart of the apparatus component parts.

The present invention consists of an apparatus and method capable of mixing the various necessary components for polyurethane foam on demand by infusing a liquid state blowing agent into at least one liquid reactant at desired temperature and pressures, and instantaneously blending the blowing agent and reactant to form a blended mixture necessary for the subsequent formation (after introduction of a polymerizing second reactant) of moldable foam. While it is possible to use the present method and apparatus for mixing the blowing agent with either reactant, that is the polyol or the isocyanate, it is preferred to mix the blowing agent with the polyol to form blended polyol for the fact that some isocyanate derivatives used in the industry pose a health and safety hazard. Therefore, in the following detailed description of the preferred embodiment, it is assumed the reactant to be mixed with the blowing agent is polyol.

Referring now to FIG. 1, apparatus 1 consists of a series of conduits capable of carrying gases or liquids under pressure. Connected in-line to these conduits are various components of the apparatus production system. It is first to be understood commensurate with ordinary skill in the art of polyurethane foam production that the blowing agent and polyol reactants are available from supply source vessels, blowing agent supply 2 and polyol supply 3, and are supplied to the apparatus under known steady state conditions. These conditions include predetermined operational pressures, temperatures, and flow rates in order to ensure consistent and reliable supply of reactant materials. The exact values of pressure, flow rate and temperature will vary with the make up of materials selected for processing. The present invention can provide desired temperature control by controlling the temperature of the blowing agent just prior to entering a motorized variable flow positive displacement blowing agent pump 7 by a temperature control means 16*a*. It will be appreciated in the art the variety of means available for measuring and controlling the temperature of the liquids in the apparatus. Moreover, the temperature control means may, if desired, be electronically linked to and controlled by an electronic process or programmable controller 8.

Leading from blowing agent supply 2, conduit 4 is first intersected by isolation valve 5*a* which may be used to start or stop the flow of the blowing agent or for isolating part of the apparatus for cleaning, inspecting or other operational function. Other isolation valves located within the system have the same purpose. Downstream of valve 5*a* is pressure gage 6*a* useful in determining and monitoring the pressure at which the blowing agent is allowed into the section of conduit 4 downstream of the gage 6*a*. Next in-line on conduit 4 is motorized, variable flow positive displacement blowing agent pump 7 to which is connected pump motor M1. Variable output, positive displacement pumping systems are required for both the blowing agent and the polyol. There are many possible combinations of types of pumps which may be used, with the primary requirement that the pump discharge rate be controllable, either manually or (as preferred) by using an electronic signal as an input to a controlling device. Downstream of the pumps 7 and 14, measuring instruments may be placed in-line with the conduits 4 and 12 to allow those parameters considered critical to the operation of the apparatus to be monitored. These are measuring devices which perform in conjunction with, or which contain, electronic devices that provide output signals to programmable controller 8. The programmable controller 8 will interpret these signals, and monitor and control these values based upon the instructions contained in the program. Parameters such as pressure, temperature, flow rate, flow volume, etc. can be monitored and or controlled. This information can also be supplied to a factory information system, if one is available, which is intended to monitor or control a plurality of similar conduit systems in a full-scale production facility, via electronic link.

Following pump 7 is pressure gage 6*b* which facilitates the accurate monitoring of blowing agent pressure allowed downstream in the system. Following gage 6*b* is isolation valve 5*b* capable of restricting the flow of blowing agent, if desired for reasons discussed in conjunction with valve 5*a*. Downstream of 5*b* is blowing agent mass flow meter 9 which can measure the mass flow rate of blowing agent passing through conduit 4. The flow meter measures the mass flow rate of the discharged blowing agent based on mass throughput (typically in pounds per minute) thereby avoiding errors and imprecision experienced with volumetric measuring means due to changes in volume caused by fluctuations in pressure or temperature. The value of the mass flow ratio of each material (blowing agent or polyol) will be transferred to the programmable controller 8 via an electronic signal. Following next is isolation valve 5*c*. Next in-line is check valve 10*a* to prevent backflow of mixed reactants, the check valve being placed just upstream of a motorized kinetic blender 11. Following 10*a*, conduit 4 leads into blender 11.

Running parallel in conception to conduit 4 is polyol agent conduit 12. Conduit 12 leads from polyol supply 3 to isolation valve 5*d* followed by pressure gage 6*c*. Pressure gage 6*c* allows the accurate measurement of polyol reactant pressure in the apparatus. Immediately downstream of gage 6*c* is motorized variable flow positive displacement polyol pump 14 connected to pump motor M2. Downstream of pump 14 is pressure gage 6*d* able to measure the pressure of polyol being pumped by pump 14 through conduit 12. Following gage 6*d* is isolation valve 5*e*. Next in-line is polyol mass flow meter 15 which is able to measure the mass flow rate of polyol reactant. Downstream of flow meter 15 is isolation valve 5*f* followed next in-line by temperature control means 16*b*. Downstream of the temperature control means 16*b* is sight glass window 17*a* useful for visually monitoring flow in conduit 12. Additional sight glasses may be placed throughout the apparatus for similar visual monitoring as desired. Following 17*a* is in-line check valve 10*b*. Following 10*b*, conduit 12 leads into blender 11.

Blender 11 contains a plurality of interlocking rotors having a plurality of shearing teeth capable of high speed operation. Blender 11 mixes the blowing agent from conduit 4 and the polyol reactant from conduit 12. The blending operation consists of passing the mixture through a device designed to intermix thoroughly any liquid materials which pass through it. Static or dynamic blenders may be used, although better results are obtained using a kinetic blender. Kinetic blending is the preferred method, because the input speed of the electric motor can be controlled, thereby giving control of the extent and degree of blending which takes place. Blender 11 is driven by a variable speed motor M3 and imparts kinetic energy to the fluids being blended. Subsequent to passage through the blending operation, the mixed material is referred to as blended polyol (or blended isocyanate should it be used instead of polyol).

Downstream of blender 11 is blended reactant conduit 18 which carries the blended components through downstream system components. Immediately following in-line is sight glass window 17*b*. Following 17*b* is blended polyol mass flow meter 19. One embodiment of the invention allows the blended polyol mass flow meter at this position. Another embodiment of the invention allows the blended polyol mass flow meter to be placed downstream of a back pressure regulator 20. The intended purpose of mass flow meter 19 is to monitor the operation of the entire system. The mass flow rate measured by this meter 19 should equal the sum of the readings of the upstream blowing agent and polyol mass flow meters 9 and 15, respectively. The readings of all three meters may be monitored by the programmable controller 8.

Following mass flow meter 19 is isolation valve 5*g* followed by pressure gage 6*e* and temperature control means 16*c*. Immediately following in-line is back pressure regulator 20. This device will maintain a selected pressure on all components upstream of its location in the system and downstream of the pumps 7 and 14 and is included to ensure that low-boiling point blowing agents are processed at pressures adequate to maintain their liquid states during processing. Next in-line after pressure regulator 20 is sight glass 17*c*. Then, the blended polyol is ready for immediate use as in reacting with isocyanate to form polyurethane or it may be stored in a day tank 21 or other storage means. It will be appreciated in the art that use of the method and apparatus described may require high pressure storage tank means when low boiling point blowing agents are used, neither of which have, as yet, been in general use in the polyurethane foam industry. Thus, retrofit of existing systems may require installation of such means.

When included in the apparatus system, the programmable controller computer program designates as the Primary Flow the flow of either the blowing agent or the polyol preblend (either component may be selected). The flow of the other material is designated the Secondary Flow. An input to the computer program from the applicable mass flow meter designates the rate of flow for the Primary fluid. The program contains a value referred to as a Mixture Ratio which is a preselected value (based on the characteristics of the blowing agent used and the desired foam qualities) which determines the ratio between the two materials being pumped. The program monitors the flow rate of the Primary fluid and the Secondary fluid. The program adjusts the output of the Secondary pump so that it varies from the flow of the Primary fluid by the value of the Mixture Ratio established in the program. This allows the ratio of one material to be controlled relative to the other. The total output from the system is varied by variance of the flow rate selected for the Primary Fluid. The Secondary Fluid will track the flow of the Primary Fluid by the ratio determined by the Mixture Ratio. The accuracy of the control is dependent upon the accuracy of the mass flow meters to measure the actual flow rate, and the capability of the pumping system to control the output of each component accurately. Selection of measuring and pumping devices is made based upon an evaluation of the accuracy requirements of the system under consideration. Error messages, status reports, and emergency shutdowns can be programmed to occur under appropriate circumstances.

An example of the practice of the invention uses 1,1,1,2 tetrafluoroethane (HFC-134a) as blowing agent, and polyol, both of which are pumped by the respective variable flow positive displacement pumps through the respective conduits at pressures generally of about between 26 psi and 250 psi, usually at about between 70 to 150 psi, and preferably at about between 70 to 130 psi, and at temperatures generally of about between 30 to 145 degrees F., usually about between 70 to 110 degrees F., and preferably about between 70 to 105 degrees F. The mass flow meter of the blowing agent monitors the actual mass flow rate of the liquid blowing agent. The programmable controller signals the polyol pump motor to run at such a speed that the mass flow of polyol relative to the mass flow of blowing agent conforms to a predetermined ratio. The programmable controller makes adjustments as required to keep the ratios of the blowing agent and polyol to the programmed levels. Generally, the mass flow ratios of blowing agent to polyol are about between 5% and 40% by weight of blowing agent in the mixture, preferably about between 20% and 30% blowing agent by weight. The polyol and blowing agent are then introduced into the kinetic mixer and thoroughly blended at rates generally at about between 300 to 3000 rpm, preferably at about between 600 and 2000 rpm. The blended material is then ready for immediate use outside the system for reacting with isocyanate and pressure reduction to induce foaming or it may be stored in a day tank or other storage means in the mixed, or blended, state until needed.

It will be appreciated by those skilled in the art that various modifications within the spirit of the invention may be made to the embodiments disclosed herein for purposes of illustration. The invention is not to be limited to those particular embodiments, but only by the scope of the appended claims and their equivalents.

What is claimed is:

1. A method of producing a blend of a polyol and a volatile blowing agent for use in forming polyurethane foam comprising:
    a) pressurizing said blowing agent to a pressure sufficient to keep said blowing agent in a liquid state;
    b) pressurizing said polyol to a pressure sufficient to keep said blowing agent in a liquid state;
    c) monitoring and controlling a mass flow rate of said blowing agent and a mass flow rate of said polyol such that said mass flow rate of said polyol is proportional to said mass flow rate of said blowing agent; and
    d) concurrently supplying to, mixing in, and discharged from a mixer flow of said blowing agent and said polyol under pressure adequate to keep said blowing agent liquefied, whereby a homogenous mixture is produced at substantially the same rate and at substantially the same time as said blowing agent and said polyol are supplied to said mixer.

2. A method according to claim 1 wherein said blowing agent is 1,1,1,2 tetrafluoroethane (HFC-134a).

3. A method according to claim 1 wherein said polyol and said blowing agent are kept under constant temperature conditions.

4. A method according to claim 1 wherein said mixing is carried out using a variable speed kinetic mixer.

5. A method according to claim 3 wherein said blowing agent and said polyol are maintained at a predetermined temperature within the range of about between 30 to 145 degrees F.

6. A method according to claim 1 wherein said flow rate of said polyol is proportional to said flow rate of said blowing agent such that the ratio of said blowing agent to said polyol is maintained at a predetermined value within the range of about between 5% to 40% by weight of blowing agent to polyol.

7. A method according to claim 1 wherein said blowing agent and said polyol are maintained at a predetermined pressure within the range of about between 26 to 250 pounds per square inch.

8. A process for producing a blended mixture of polyol and a volatile blowing agent for use in polyurethane foam formation comprising a combination of steps comprising:
    a) channeling a liquefied material satisfactory as a blowing agent through a first conduit;
    b) channeling a liquid polyol through a second conduit;
    c) pumping said liquefied material using a pumping means along said first conduit through a mass flow metering means and measuring a mass flow rate of said liquefied material;
    d) pumping said liquid polyol using a pumping means along said second conduit through a mass flow metering means and measuring a mass flow rate of said liquid polyol;
    e) comparing said mass flow rate of said liquefied material to said mass flow rate of said liquid polyol and adjusting the rate at which one of said liquefied material or liquid polyol is pumped so that a specified ratio of the mass flow rates of said liquefied material and said liquid polyol can be established and maintained;
    f) channeling said liquid polyol and liquefied material being pumped into a mixer means; and
    g) concurrently supplying to, blending in, and discharging from said mixer, in a manner sufficient to create a homogenous blend, a continuous flow of said liquid polyol and liquefied material whereby the homogenous mixture is produced at substantially the same rate and at substantially the same time as said blowing agent and said polyol are supplied to said mixer.

9. A process according to claim 8 wherein said blowing agent is 1,1,1,2 tetrafluoroethane (HFC-134a).

10. A process according to claim 8 wherein said mixer means is a variable speed kinetic mixer.

11. A process according to claim 8 wherein said pumping means is a variable flow positive displacement pump.

12. A process according to claim 8 wherein said blowing agent and said polyol are maintained under constant temperature conditions.

13. A process according to claim 8 wherein said pumping means are programmed to pump said blowing agent and said polyol in a ratio of blowing agent to polyol within a range of from about between 5% to 40% by weight of blowing agent to polyol.

14. A process according to claim 12 wherein said blowing agent and said polyol are maintained at a predetermined constant temperature within the range of about between 30 to 145 degrees F.

15. A process according to claim 8 wherein said blowing agent and said polyol are maintained at a predetermined pressure within the range of about between 26 to 250 pounds per square inch.

16. A process for producing a blended mixture of polyol and a volatile blowing agent for use in polyurethane foam formation comprising a combination of the steps comprising:
   a) channeling a material satisfactory as a blowing agent through a first pressurized conduit;
   b) channeling polyol through a second pressurized conduit;
   c) pumping said material using a pumping means along said first pressurized conduit through a mass flow metering means and measuring a mass flow rate of said material being pumped;
   d) pumping said polyol using a pumping means along said second pressurized conduit through a mass flow metering means and measuring a mass flow rate of said polyol;
   e) comparing said mass flow rate of said material to said mass flow rate of said polyol and adjusting the rate at which one of said material or polyol is pumped along said first or second pressurized conduits so that a specified ratio of the masses of said material and said polyol can be established and maintained;
   f) channeling said polyol and said material being pumped through a pressurized mixer means; and
   g) concurrently supplying to, blending in, and discharging from said mixer means a continuous flow of said polyol and said material under a pressure sufficient to maintain said polyol and said material in a liquefied state throughout said blending process and at a blending rate sufficient to form a homogeneous blend of said polyol and said material, whereby a homogenous mixture is produced at substantially the same rate and at substantially the same time as said blowing agent and said polyol are supplied to the mixer.

17. A process according to claim 16 wherein said blowing agent is 1,1,1,2 tetrafluoroethane (HFC-134a).

18. A process according to claim 16 where in said pumping means is a variable speed positive displacement pump.

19. A process according to claim 16 wherein said mixer means is a variable speed kinetic mixer.

20. A process according to claim 16 wherein said blowing agent and said polyol are maintained under constant temperature conditions.

21. A process according to claim 20 wherein said blowing agent and said polyol are maintained at a constant predetermined temperature within the range of about 30 to 145 degrees F.

22. A process according to claim 16 wherein said pumping means are programmed to pump said blowing agent and said polyol at a ratio of blowing agent to polyol within the range of about between 5% to 40% by weight of blowing agent to polyol.

23. A process according to claim 16 wherein said blowing agent and said polyol are maintained at a predetermined pressure within the range of about between 26 to 250 pounds per square inch.

24. A process for producing a blended mixture of polyol and a volatile blowing agent for use in polyurethane foam formation comprising:
   a) channeling a liquefied material satisfactory as a blowing agent through a first pressurized conduit;
   b) channeling a liquid polyol through a second pressurized conduit;
   c) pumping said liquefied material using a variable speed positive displacement pump along said first pressurized conduit through a mass flow metering means and measuring a mass flow rate of said liquefied material, [0axb]p1d) pumping said liquid polyol using a variable speed positive displacement pump along said second pressurized conduit through a mass flow metering means an measuring a mass flow rate of said liquid polyol;
   e) comparing said mass flow rates of said liquefied material and said liquid polyol and adjusting the rate at which one of sad liquid polyol or liquefied material is pumped so that a specified ratio of the masses of said liquefied material and said liquid polyol can be established and maintained;
   f) channeling said liquefied material and liquid polyol through a pressurized variable speed kinetic mixer; and
   g) concurrently supplying to, blending in, and discharging from said variable speed kinetic mixer a continuous flow of said liquid polyol and said liquefied material under a pressure sufficient to maintain said polyol and said material in a liquid state and at a blending rate sufficient to form a homogeneous blend of said liquid polyol and said liquefied material, whereby a homogeneous mixture is produced at substantially the same rate and at substantially the same time as said blowing agent and said polyol are supplied to said mixer.

25. A process according to claim 24 wherein said blowing agent is 1,1,1,2 tetrafluoroethane (HFC-134a).

26. A process according to claim 24 wherein said blowing agent and said polyol are maintained under constant temperature conditions.

27. A process according to claim 26 wherein said blowing agent and said polyol are maintained at a predetermined temperature within the range of about between 30 to 145 degrees F.

28. A process according to claim 24 wherein said variable speed positive displacement pumps are programmed to pump said blowing agent and said polyol at said specified ratio within the range of about between 5% to 40% by weight of said blowing agent to said polyol.

29. A process according to claim 24 wherein said blowing agent and said polyol are maintained at a predetermined pressure within the range of about between 26 to 250 pounds per square inch.

30. A method of producing a blend of an isocyanate and a volatile blowing agent for use in forming polyurethane foam comprising:
   a) pressurizing said blowing agent to a pressure sufficient to keep said blowing agent in a liquid state;
   b) pressurizing said isocyanate at a pressure sufficient to keep said blowing agent in a liquid state;c)
   c) monitoring and controlling a mass flow rate of said blowing agent and a mass flow rate of said isocyanate such that said mass flow rate of said isocyanate is proportional to said mass flow rate of said blowing agent; and
   d) concurrently supplying to, mixing in, and discharging from a mixer a continuous flow of said blowing agent with said isocyanate under pressure adequate to keep said blowing agent liquefied, whereby homogeneous mixture is produced at substantially the same rate and at substantially the same time as said blowing agent and said isocyanate are supplied to said mixer.

31. A method according to claim 30 wherein said blowing agent is 1,1,1,2 tetrafluoroethane (HFC-134a).

32. A method according to claim 30 wherein said isocyanate and said blowing agent are kept under constant temperature conditions.

33. A method according to claim 30 wherein said mixing is carried out using a variable speed kinetic mixer.

34. A method according to claim 32 wherein said blowing agent and said isocyanate are maintained at a predetermined temperature within the range of about between 30 to 145 degrees F.

35. A method according to claim 30 wherein said flow rate of said isocyanate is proportional to said flow rate of said blowing agent such that the ratio of said blowing agent to said isocyanate is maintained at a predetermined value within the range of about between 5% to 40% by weight of blowing agent to isocyanate.

36. A method according to claim 30 wherein said blowing agent and said isocyanate are maintained at a predetermined pressure within the range of about between 26 to 250 pounds per square inch.

37. A method of producing a liquid blend of a volatile blowing agent, and a material selected from the group consisting of polyol and isocyanate, for use in forming polyurethane foam comprising:
   a) pressurizing said blowing agent to a pressure sufficient to keep said blowing agent in a liquid state, said blowing agent having the formula 1,1,1,2 tetrafluoroethane (HPC-134a), and said pressure having a range of about 26 to 250 pounds per square inch;
   b) pressurizing said material to a pressure sufficient to keep said blowing agent in a liquid state, said pressure having a range of about 26 to 250 pounds per square inch;
   c) monitoring and controlling a mass flow rate of said blowing agent and a mass flow rate of said material such that said mass flow rate of said material is proportional to said mass flow rate of said blowing agent, said proportionality of said blowing agent to said material being maintained at a predetermined value within the range of between 5% to 40% by weight of blowing agent to material;
   d) monitoring and maintaining said blowing agent and said material at a predetermined temperature within the range of between 30 to 145 degrees F.; and
   e) concurrently supplying to mixing in and discharging from a variable speed kinetic mixer, a continuous flow of said blowing agent and said material under pressure adequate to keep said blowing agent liquefied, said pressure having a range of about 26 to 250 pounds per square inch, whereby a homogenous mixture is produced at substantially the same rate at the same time as said blowing agent and polyol and supplied to said mixer.

* * * * *